United States Patent Office 3,829,479
Patented Aug. 13, 1974

3,829,479
**PREPARATION OF ALKYLDICHLORO-
PHOSPHINES**
Alan Kent, Greetby Hill, Ormskirk, and Bryan Topley,
Compton, Kinver, near Stourbridge, England, assignors
to Minister of Supply, in Her Majesty's Government of
the United Kingdom of Great Britain and Northern
Ireland, London, England
No Drawing. Filed Mar. 22, 1955, Ser. No. 496,074
Int. Cl. C07f 9/28
U.S. Cl. 260—543 P        4 Claims This invention relates to the manufacture of alkyl phosphorus halides and more particularly to alkyl dichlorophosphines, for instance methyl-dichlorophosphine.

In the manufacture of methyldichlorophosphine, $$CH_3.PCl_2$$

by methylation of phosphorus trichloride with methylaluminium sesquichloride, $CH_3AlCl_2+(CH_3)_2AlCl$, the immediate product of the reaction between methylaluminium sesquichloride and phosphorus trichloride is a mixture of complex compounds which crystallise out of the excess of phosphorus trichloride employed. From this mixture only a minor proportion of the desired methyl-dichlorophosphine can be dissociated from its combination with aluminium chloride by the action of heat alone, the greater part remains unvolatilised in the form of a complex with aluminium chloride. In order to displace the methyldichlorophosphine from its combination with the aluminium chloride it is necessary to add some substance capable of combining more firmly with the aluminium chloride than the methyldichlorophosphine already combined.

Sodium chloride can be used to displace methyldichlorophosphine from its state of combination with aluminium chloride. It is advantageous to use sodium chloride because of its cheapness and because complete separation of methyldichlorophosphine is automatically achieved during the de-complexing operation both from the compound of sodium chloride with aluminium chloride and from excess sodium chloride. The reaction that occurs when sodium chloride is added to a mixture of the said complex compounds and heat is applied can be formulated as follows:

$$CH_3PCl_2.AlCl_3+(CH_3PCl_2)_2.AlCl_3$$
$$+2NaCl=3CH_3PCl_2+2NaAlCl_4$$

We have now found that the yield of methyldichlorophosphine can be substantially increased by grinding the sodium chloride to a fine state of subdivision before adding it to the suspension of the aforesaid complex compounds in phosphorus trichloride.

It is advisable to add an excess of sodium chloride, and we find that a proportion of three molecules or four molecules instead of the two that are theoretically sufficient gives good results.

Our invention consists in using very finely divided alkali chloride preferably sodium chloride instead of the ordinary small granular sodium chloride of commerce such as commercial "vacuum evaporated salt."

Thus the invention provides a process for the manufacture of an alkyl dihalophosphine by decomplexing a complex compound of an aluminium trihalide and the alkyl dichlorophosphine with the aid of an alkali halide, wherein the decomplexing reaction is effected by heating the said complex compound with very finely divided alkali halide. Moreover, the average particle size of the alkali halide is preferably such that most of it will pass a screen of 100 mesh British Standard Specification. More specifically, the invention consists in an improved process for decomplexing a complex compound of aluminium trichloride and an alkyl dichlorophosphine, for example methyldichlorophosphine, by heating the said complex compound with very finely divided alkali chloride, preferably sodium chloride the average particle size of which is sufficiently small to pass a screen of 100 B.S.S.

In order that the invention may be readily understood, the same will be described by way of example with reference to the production of methyldichlorophosphine.

When using unground "vacuum evaporated salt" (which as used by us had a particle size mainly in the range 20 to 40 mesh) the yield of methyldichlorophosphine obtained was 66 percent of the amount theoretically possible if all the methyl group in the methylaluminium sesquichloride used to produce the mixture of complexes had been recovered as methyldichlorophosphine. By grinding the sodium chloride ("vacuum evaporated salt") until most of the particles would pass a 100 mesh B.S. screen, and 80 percent would pass a 200 mesh screen, the yield of methyldichlorophosphine rose to 82.5 percent of the theoretical, calculated with reference to methyl group as above. The yield calculated with reference to phosphorus trichloride actually consumed is higher than the yield calculated with reference to methyl group, but this also shows substantial improvement; thus a yield expressed with reference to phosphorus trichloride of 79 percent using unground sodium chloride ("vacuum evaporated salt") improved to 88.5 percent when the finely ground sodium chloride was employed.

The reason for the improved yields obtained by using finely ground sodium chloride is not obvious, but the explanation may lie in the following observations, which involve consideration of some details of the process. Before the sodium chloride is added, the mixture of the two solid complex compounds $CH_3PCl_2.AlCl_3$ and $$(CH_3PCl_2)_2.AlCl_3$$

together with the excess of phosphorus trichloride forms a fluid system. After adding unground sodium chloride (20–40 mesh) in quantity equal to four molecules for two atoms of aluminium present, the system is still sufficiently fluid to be readily stirred. On applying heat, whilst stirring, distillation begins at about the boiling point of phosphorus trichloride. The distillate at first consists of phosphorus trichloride carrying a minor proportion of methyldichlorophosphine. Distillation continues as the temperature in the fluid is increased, but in the range 90° C. to 100° C. the rate of distillation drops markedly, with further heating distillation again becomes rapid in the neighbourhood of 125° C., and the distillate now consists of methyldichlorophosphine with a minor proportion of phosphorus trichloride. Distillation continues as the temperature is raised, becoming slower and finally ceasing in the neighbourhood of 165° C. to 170° C., and above that temperature no further distillation occurs. The residue is very fluid, and remains so as it cools until the temperature reaches 135° C. to 130° C., when crystallisation takes place. We have observed that in the later stages of the distillation the proportion of phosphorus trichloride in the vapour rises considerably. Taking this fact in conjunction with the fact that the yield of methyldichlorophosphine is higher in relation to phosphorus trichloride consumed in the process than in relation to methyl group consumed, we conclude that the efficiency of the process is affected by intervention of a disproportionation reaction, which may be formulated as follows:

$$2CH_3PCl_2=(CH_3)_2PCl+PCl_3$$

or $$2CH_3PCl_2.AlCl_3=(CH_3)_2PCl.AlCl_3+PCl_3+AlCl_3$$

The dimethylchlorophosphine is not volatilised to any appreciable extent, which is explained by the much greater stability of its complex with aluminium chloride than that of methyldichlorophosphine. Phosphorus trichloride does not form a stable complex with aluminium chloride.

In view of the secondary increase in the proportion of phosphorus trichloride in the final stages of the distillation, already mentioned we conclude that the disproportionation reaction probably occurs mainly at the higher temperature used to complete the distillation. When in accordance with the invention finely ground sodium chloride is substituted for comparatively coarse sodium chloride there is evidence of increased reactivity in the lower half of the temperature range of 20° C. to 165° C.; for example, if the finely ground sodium chloride is introduced when the mixture of phosphorus trichloride and the complexes $CH_3PCl_2 \cdot AlCl_3$ and $(CH_3PCl_2)_2 \cdot AlCl_3$ is at 50° C., spontaneous slight evolution of heat occurs. Also the rather distinct transition from distillation of a product consisting predominantly of phosphorus trichloride to a product consisting predominantly of methyldichlorophosphine, which as has been described occurs at about 125° C., when comparatively coarse sodium chloride is used, is less marked when finely ground sodium chloride is used, and a greater proportion of the total distillate is obtained below 150° C. It appears therefore that the use of finely ground sodium chloride makes it practicable to distill off a larger proportion of the theoretically obtainable amount of methyldichlorophosphine at temperatures below those at which serious intervention of the disproportionation reaction takes place.

Whether the foregoing explanation of the beneficial effect of using finely ground sodium chloride is correct or incorrect, we submit that the beneficial effect could not have been predicted. We do not wish to be limited in the statement of our invention by any inadequacy of the hypothesis we have proposed to account for the effects observed.

It is to be understood that the invention is not intended to be limited to the example described. Thus the invention includes a process for the manufacture of other alkyl dichlorophosphines by decomplexing a complex compound of aluminium trichloride and the alkyl dichlorophosphine for instance, the ethyl derivative, by heating the said complex compound with very finely divided alkalichloride.

The alkali chloride may be for example sodium chloride, potassium chloride or ammonium chloride. Sodium chloride is however the preferred alkali chloride because the compounds formed by potassium chloride and ammonium chloride with aluminium trichloride are higher melting than the sodium aluminium chloride $NaAlCl_4$. Moreover, the process is not limited to complex compounds produced by alkylating phosphorus trichloride with a mixture or alkyl aluminium chlorides (i.e. the sesquichloride) but includes decomplexing complexes formed by alkylating a phosphorus trihalide with an alkyl aluminium dihalide or a dialkyl aluminium monohalide.

We claim:

1. Process for the manufacture of a lower alkyl dichlorophosphine by decomplexing a complex compound of aluminium trichloride and the lower alkyl dichlorophosphine with an alkali chloride, wherein the decomplexing reaction is effected by heating the said complex compound with very finely divided alkali chloride substantially all of which will pass a screen of 100 mesh B.S.S.

2. Process for the manufacture of methyldichlorophosphine wherein a complex compound of aluminium trichloride and methyldichlorophosphine is decomplexed by heating the said complex compound with finely divided sodium chloride substantially all of which will pass a screen of 200 mesh B.S.S.

3. Process for the manufacture of ethyl dichlorophosphine wherein a complex compound of aluminium trichloride and ethyl dichlorophosphine is decomplexed by heating the said complex compound with finely divided sodium chloride substantially all of which will pass a screen of 200 mesh B.S.S.

4. Method of decomplexing a mixture of complex compounds of methyl dichlorophosphine and aluminium chloride which comprises heating the said mixture with an excess of finely ground sodium chloride, which will pass a screen of 100 mesh B.S.S., to a temperature of 125° C., distilling off the methyl dichlorophosphine and continuing the distillation by gradually raising the temperature to about 150° C.

References Cited

UNITED STATES PATENTS 2,137,792    11/1938    Woodstock _____ 260—606.5 X

LELAND A. SEBASTIAN, Primary Examiner